(12) United States Patent
Fischer et al.

(10) Patent No.: US 11,519,583 B2
(45) Date of Patent: Dec. 6, 2022

(54) LIGHTING APPARATUS FOR VEHICLES

(71) Applicant: HELLA GmbH & Co. KGaA, Lippstadt (DE)

(72) Inventors: Guenther Fischer, Lippstadt (DE); Benjamin Willeke, Paderborn (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/478,230

(22) Filed: Sep. 17, 2021

(65) Prior Publication Data

US 2022/0003381 A1 Jan. 6, 2022

Related U.S. Application Data

(63) Continuation of application No. PCT/EP2020/056502, filed on Mar. 11, 2020.

(30) Foreign Application Priority Data

Mar. 20, 2019 (DE) ...................... 10 2019 107 075.9

(51) Int. Cl.
*F21S 43/20* (2018.01)
*F21Y 115/10* (2016.01)

(52) U.S. Cl.
CPC .......... *F21S 43/26* (2018.01); *F21Y 2115/10* (2016.08)

(58) Field of Classification Search
CPC ....................................................... F21S 43/26
See application file for complete search history.

(56) References Cited

U.S. PATENT DOCUMENTS

| 2015/0002628 | A1 | 1/2015 | Reif |
| 2017/0227183 | A1* | 8/2017 | Cho ........................ F21V 7/00 |
| 2018/0003356 | A1* | 1/2018 | Muster .................... F21S 41/16 |
| 2018/0040775 | A1* | 2/2018 | Wakamatsu ........... H01L 33/62 |
| 2018/0210120 | A1* | 7/2018 | Di Trapani .......... G02B 5/0294 |
| 2019/0011095 | A1 | 1/2019 | Boonekamp et al. |
| 2019/0137664 | A1 | 5/2019 | Stasiak |

(Continued)

FOREIGN PATENT DOCUMENTS

| DE | 102016125420 A1 | 6/2018 |
| WO | WO2015092014 A1 | 6/2015 |
| WO | WO2018022051 A1 | 2/2018 |

OTHER PUBLICATIONS

International Search Report dated May 26, 2020 in corresponding application PCT/EP2020/056502.

*Primary Examiner* — Bryon T Gyllstrom
*Assistant Examiner* — Christopher E Dunay
(74) *Attorney, Agent, or Firm* — Muncy, Geissler, Olds & Lowe, P.C.

(57) ABSTRACT

A lighting apparatus for vehicles, comprising a light source and comprising an optical unit for generating a specified light distribution, wherein the optical unit has an optical element with a light entry surface for coupling in light emitted by the light source and with a light exit surface, disposed at a distance from the light entry surface, for coupling out the light that has been input coupled at the light entry surface and guided along the principal light guiding direction within the optical element, wherein the optical element is embodied as a layered body with a plurality of layers, wherein at least a number of the layers respectively have sections of materials with different refractive indices.

15 Claims, 2 Drawing Sheets

(56) References Cited

U.S. PATENT DOCUMENTS

| | | | |
|---|---|---|---|
| 2019/0319219 A1* | 10/2019 | Kitahara | H05B 33/02 |
| 2019/0368689 A1* | 12/2019 | Rotzer | F21S 43/50 |
| 2020/0217477 A1* | 7/2020 | Nicholson | F21S 41/36 |
| 2020/0384740 A1* | 12/2020 | Berard | F21S 43/195 |
| 2020/0386382 A1* | 12/2020 | Choi | F21S 43/26 |
| 2021/0041075 A1* | 2/2021 | Niu | G02B 19/0014 |
| 2021/0046738 A1* | 2/2021 | Izu | B60Q 1/30 |
| 2021/0062991 A1* | 3/2021 | Groene | F21S 43/26 |
| 2022/0026038 A1* | 1/2022 | Go | F21S 41/285 |
| 2022/0072995 A1* | 3/2022 | An | B60Q 1/50 |

\* cited by examiner

LIGHTING APPARATUS FOR VEHICLES

This nonprovisional application is a continuation of International Application No. PCT/EP2020/056502, which was filed on Mar. 11, 2020, and which claims priority to German Patent Application No. 10 2019 107 075.9, which was filed in Germany on Mar. 20, 2019, and which are both herein incorporated by reference.

BACKGROUND OF THE INVENTION

Field of the Invention

The present invention relates to a lighting apparatus for vehicles, comprising a light source and comprising an optical unit for generating a specified light distribution, wherein the optical unit has an optical element with a light entry surface for coupling in light emitted by the light source and with a light exit surface, disposed at a distance from the light entry surface, for coupling out the light that has been input coupled at the light entry surface and guided along the principal light guiding direction (H) within the optical element.

Description of the Background Art

A lighting apparatus for vehicles is known from DE 10 2016 125 420 A1 which comprises a light source and an optical element, assigned to the same, as an optical unit. The optical element is embodied as a lens which is produced by compression molding or injection molding. The lens has a light entry surface and a light exit surface. To avoid or to reduce unwanted back reflections to the light source, the lens has an anti-reflective coating at least on the light entry surface. The known lens-shaped optical element has the light entry surface and the light exit surface as the refractive surface. By shaping the light entry surface and/or the light exit surface, a desired refractive effect of the optical element can be achieved, so that a specified light distribution can be generated.

SUMMARY OF THE INVENTION

It is therefore an object of the present invention to further develop a lighting apparatus for vehicles comprising a light source and an optical element such that a specified optical effect of the optical element is created with a simple geometric design of the optical element.

To achieve said object, the optical element may be embodied as a layered body with a plurality of layers, wherein at least a number, e.g., two of the layers each have sections of materials with different refractive indices.

According to the invention, an optical element is built up in layers, wherein the layers each have sections of materials with different refractive indices, so that the location of the refraction occurs not only at the light entry surface and light exit surface adjacent to the medium air, but also within the optical element. The invention not only provides for the refraction of light in layers, but moreover also for the refraction of light within the respective layers. In this way, a conventional lens shape of the optical element can advantageously be recreated, wherein, according to the optical element of the invention embodied as a layered body, the light entry surface and/or the light exit surface are of flat design. The optical element can thus have a simple geometric shape. The basic idea of the invention is to transform the shape of the optical element required for the light refraction in a conventional optical element (lens) into a volume of a plate-shaped optical element. By selecting the refractive index in layer sections of the layered body, a specified light distribution can advantageously be generated regardless of the shape of the optical element. Different imaging characteristics can thus be generated with one and the same shape of the optical element. Due to the same shaping of the optical element, it can easily be fastened in a housing of the lighting apparatus. Due to the preferably identical appearance, the design of the lighting apparatus has a uniform character.

The layers of the layered body can run parallel to the light entry surface and/or the light exit surface. Advantageously, in this case the materials with different refractive indices are applied in layers one after the other, wherein the layers in their optical effect each correspond to an imaginary layer of an optical element conventionally produced in one piece. In this way, a conventional optical element can advantageously be recreated in a simple manner, wherein the shape-refractive effect of the conventional optical element is replaced by a material-refractive effect of sections of the layers of the optical element of the invention.

The layers can have the same layer thickness. The smaller the layer thickness, the greater the refractive effect of the sections in the respective layers.

The layer thickness of the layers can be in a range between 10 μm and 30 μm. The optical element can advantageously have a relatively flat structure with a relatively high refractive effect.

The layers of the optical element can be connected in one piece to one another. The optical element can be installed as a single component in a housing of the lighting apparatus.

The optical element can be produced by sequential application of the layers. In terms of production technology, multiple layers can be placed one on top of the other in a simple manner.

The optical element can be produced by printing the layers. The sections of the layers can advantageously be formed by individual points which then harden later and form a layer. This ensures a relatively high resolution of the layers.

Sections of different layers may be arranged one behind the other in the principal light guiding direction, are formed from materials with different refractive indices, so that the refractive indices change at least three times in the principal emission direction. In this way, a transformation or replication of lenses with undercuts can advantageously be produced.

The sections of the respective layers can extend in a matrix-like manner in columns and rows, wherein the sections of the layers are each of the same size. In this way, material points of different or identical refractive indices, said points being arranged in a matrix-like manner, can advantageously be applied per layer.

The sections of the respective layers can be arranged in alignment with one another and projected in the principal light guiding direction. The sections of the same or different refractive indices thus overlap in projection onto a surface/plane. The optical element thus has a simple and regular structure.

The optical element can be applied to a transparent support. The support enables a sufficient stability of the optical element.

The support can be embodied as a refractive body. In this way, a certain refractive power can advantageously be set hereby before the light enters the optical element. In this way, in particular, primary optics of the lighting apparatus can be dispensed with.

The light source and the optical element can be disposed in a pot-shaped housing. A pot-shaped housing can be understood to mean any form of housing with at least one opening which is closed by a cover plate. The optical unit is here formed exclusively by the optical element. Optionally, the cover plate can have a scattering optic. Within the housing, the optical element forms the only optical light guide.

The light entry surface and/or the light exit surface of the layered body can have an anti-reflective coating, so that an unwanted reflection of the light in the direction of the light source is reduced or avoided.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
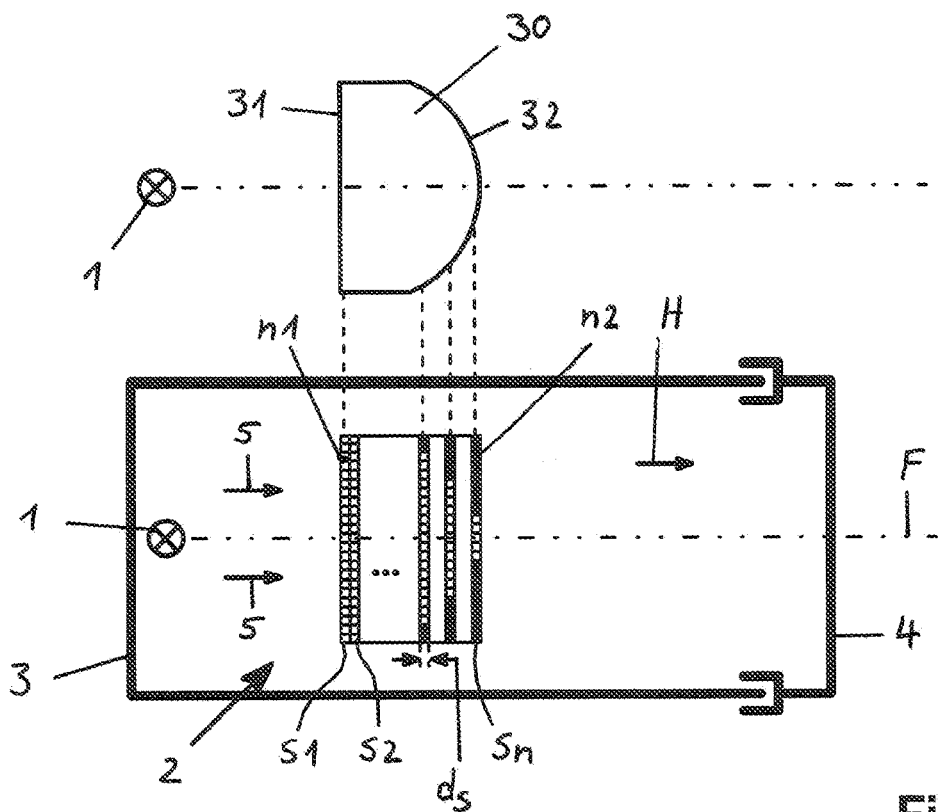
FIG. 1 shows a schematic side view of a lighting apparatus comprising an optical element according to a first embodiment.

A lighting apparatus of the invention for vehicles can be used to generate a light distribution. For example, the lighting apparatus can serve as a signal light for generating a daytime running light distribution, a direction indicator light distribution, or a brake/tail light distribution.

The lighting apparatus essentially has a light source 1 to which an optical element 2 is assigned. Light source 1 and optical element 2 are disposed in a pot-shaped housing 3, the opening of which is closed by a cover plate 4. Cover plate 4 can be colored, crystal clear, free of scattering optics, or provided with scattering optics.

Optical element 2 forms an optical unit which extends within an interior space of housing 3. To generate the specified light distribution of the lighting apparatus, optical element 2 is the only component within housing 3 that is used to guide light 5 emitted by light source 1.

Optical element 2 is designed in the form of a plate as a layered body which has a plurality of layers S1, S2, ... $S_n$. On a light entry side facing light source 1, a first layer S1 is embodied as a light entry surface at which light 5 is coupled into layered body 2. On a light exit side facing away from light source 1, the layer $S_n$ is embodied as a light exit surface at which light 5 coupled into layered body 2 and light 5 guided through layered body 2 in a principal light guiding direction H are coupled out of layered body 2. Both light entry surface S1 and light exit surface $S_n$ form an interface of layered body 2 with the medium air. The adjacent layers S1, S2, ... $S_n$ are disposed within optical element 2, lying flat against one another—without a gap.

Layers S1, S2, ... $S_n$ are arranged parallel to one another and each run in a plane.

In the present exemplary embodiment, layers S1, S2, ... $S_n$ have the same layer thickness $d_s$. The layer thickness $d_s$ is in a range from 10 μm to 30 μm; the layer thickness $d_s$ is preferably in a range from 10 μm to 20 μm, and the layer thickness is preferably 16 μm.

Layers S1, S2, ... $S_n$ of layered body 2 are connected in one piece to one another. Layers S1, S2, $S_n$ are produced one after the other by sequential application using a material dispenser. In this case, material drops and/or material points are deposited as sections $A_{11}, A_{12}, A_{13}, A_{21}, A_{22}, \ldots A_{nm}$ with a material of the same or different refractive index. As soon as, for example, material drops or material points of the applied first layer S1 have hardened, the further layer S2 can be applied by depositing the corresponding material drops or material points. This continues until the last layer $S_n$ has been applied.

Figure 3:
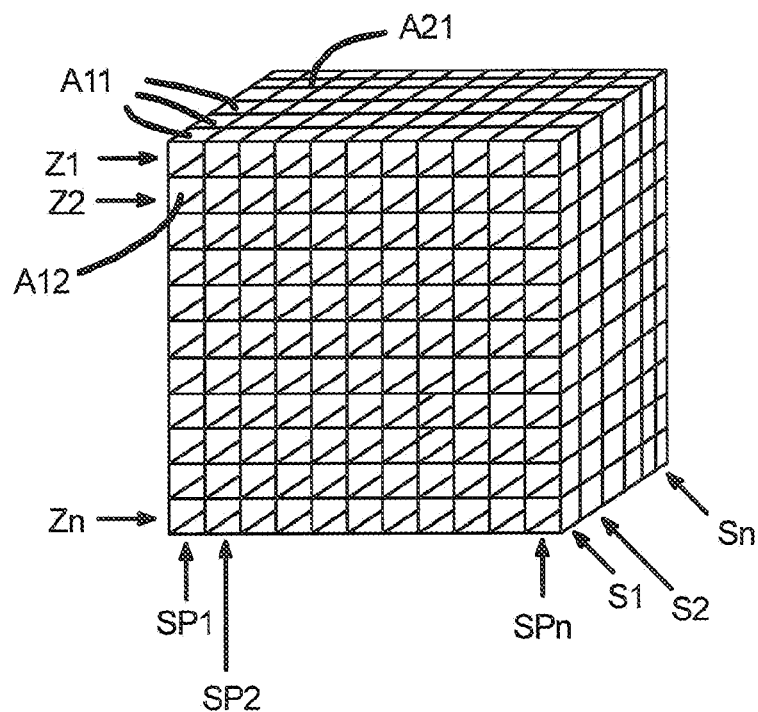
FIG. 3 shows a schematic representation of multiple layers of an optical element of the lighting apparatus.

For example, the material dispenser can be a printing unit that deposits transparent plastic material of the same or different refractive indices to the corresponding sections $A_{11}, A_{12}, A_{13}, A_{21}, A_{22}, \ldots A_{nm}$ of the respective layers S1, S2, ... $S_n$. As can be seen in particular from FIG. 3, layers S1, S2, ... $S_n$ are of the same size. They have the same number of sections $A_{11}, A_{12}, A_{13}, A_{21}, A_{22}, \ldots A_{nm}$ arranged in a matrix-like manner. Layers S1, S2, ... $S_n$ thus have the same number of columns and rows of sections $A_{11}, A_{12}, A_{13}, A_{21}, A_{22}, \ldots A_{nm}$ optionally having different refractive indices. Sections $A_{11}, A_{12}, A_{13}, A_{21}, A_{22}, \ldots A_{nm}$ of layers S1, S2, $S_n$ are each made the same size; i.e., they have the same dimensions.

Sections $A_{11}, A_{12}, A_{13}, A_{21}, A_{22}, \ldots A_{nm}$ of the respective layers S1, S2, $S_n$ are arranged in alignment with one another, so that in a projection in the principal light guiding direction H of layered body 2 they are arranged in alignment or overlap in alignment with one another.

According to a first embodiment of the invention according to FIG. 1, optical element 2 is formed in layers with sections $A_{11}, A_{12}, A_{13}, A_{21}, A_{22}, \ldots A_{nm}$, such that it corresponds with respect to the optical effect of a conventional plano-convex lens 30 with a flat light entry surface 31 disposed on the light entry side and to a convex light exit surface 32 disposed on the side facing away from light source 1. The previously known lighting apparatus with plano-convex lens 30 is disposed laterally offset to optical element 2 in FIG. 1 in order to make the equivalence of optical element 2 to the plano-convex lens 30 clear.

The same components or component functions in the exemplary embodiments are provided with the same reference characters.

Layered body 2 according to FIG. 1 in a part (half) of the same, which faces light source 1, has a plurality of layers S1, ... $S_p$, which respectively have section $A_{11}, A_{12}, A_{13}, A_{21}, A_{22}, \ldots A_{nm}$ comprising a material with a first refractive index n1 (white sections $A_{11}, A_{12}, A_{13}, A_{21}, A_{22}, \ldots A_{nm}$). Layers $S_{p1}, \ldots S_n$ are arranged in a part (half) of layered body 2, said part facing away from light source 1; their sections $A_{11}, A_{12}, A_{13}, A_{21}, A_{22}, \ldots A_{nm}$ have a material of the first refractive index n1 (white sections $A_{11}, A_{12}, A_{13}, A_{21}, A_{22}, \ldots A_{nm}$) and a material of the second refractive index n2 (black sections $A_{11}, A_{12}, A_{13}, A_{21}, A_{22}, \ldots A_{nm}$). The distribution of sections $A_{11}, A_{12}, A_{13}, A_{21}, A_{22}, \ldots A_{nm}$ of the material of the first refractive index n1 and of the second refractive index n2 is selected such that the refraction of light 5 in a region remote from the optical axis F is greater than in a region of layered body 2 close to the optical axis F. In the present exemplary embodiment, the sections $A_{11}$, $A_{12}$, $A_{13}$, $A_{21}$, $A_{22}$, ... $A_{nm}$ of the material of the second refractive index n2 correspond to a region outside light exit surface 32 of plano-convex lens 30, whereas sections $A_{11}$, $A_{12}$, $A_{13}$, $A_{21}$, $A_{22}$, ... $A_{nm}$ of the material of the first refractive n1 correspond to a region within the plano-convex lens 30. In this way, the distribution of the material points or sections $A_{11}$, $A_{12}$, $A_{13}$, $A_{21}$, $A_{22}$, ... $A_{nm}$ of the material of first refractive index n1 and of second refractive index n2 can be easily inferred depending on the dimension of a conventional lens shape.

As can be seen from FIG. 1, optical element 2 has a quadrangular shape. In particular, light entry surface S1 and light exit surface $S_n$ are parallel and planar.

Figure 2:
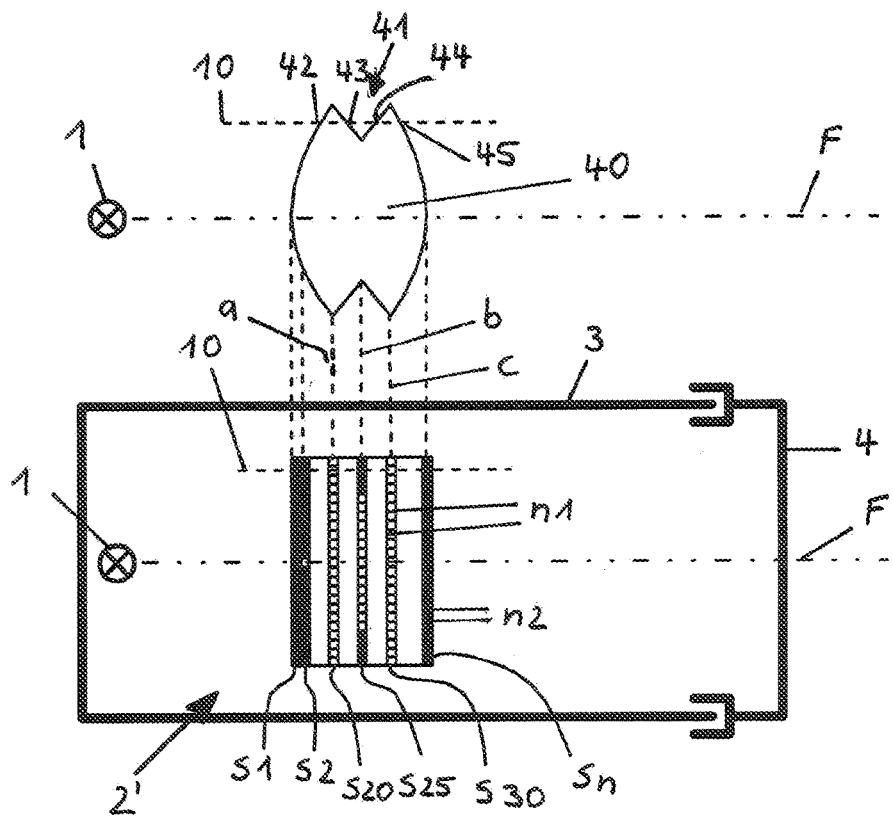
FIG. 2 shows a schematic side view of a second embodiment of the lighting apparatus, in which the optical element corresponds to a conventional undercut optical element.

According to a second embodiment of the invention according to FIG. 2, an optical element 2' is embodied such that its optical effect corresponds to a convex lens 40 with undercuts 41. For this purpose, layers S1, S2, ... $S_n$ have respectively the sections $A_{11}$, $A_{12}$, $A_{13}$, $A_{21}$, $A_{22}$, ... $A_{nm}$ of different materials of refractive index n1 and n2, such that in the principal light guiding direction H the number of sections $A_{ij}$ with the refractive index n1 and n2 and disposed in a region remote from optical axis F change at least four times. By way of example, a line 10 is shown in FIG. 2, which runs in the principal light guiding direction H and is located in a region which is remote from the optical axis F and in which undercut 41 of conventional lens 40 is reproduced or formed. Starting from light entry layer S1, the material or the refractive index n1, n2 of the sections $A_{ij}$ changes four times in the principal light guiding direction H up to the light-exit-side layer Sn, wherein layers S20, S25, and S30 are shown by way of example. Layer S20 runs in a plane in which conventional lens 40 has the maximum radial extent. Thus, it runs in plane 'a'. Layer S25 runs in a plane b in which lens 40 has its smallest radial extent. Layer S30 runs in a plane c in which the second maximum radial extent of lens 40 is located. Whereas layers S20 and S30 solely have sections $A_{ij}$ with refractive index n1, layer S25 solely has sections $A_{ij}$ with refractive index n2. It is clear from the points of intersection of line 10 with lens 40 that sections $A_{ij}$ in each case have a material with the refractive index n1 in a region between points 42 and 43 and 44 and 45 and with the refractive index n2 in the region between points 43 and 44.

Because lens 40 is designed to be rotationally symmetrical, the distribution of sections $A_{ij}$ of the material with the first refractive index n1 and of the material with the second refractive index n2 in optical element 2' is also rotationally symmetrical to the optical axis F.

Figure 4:
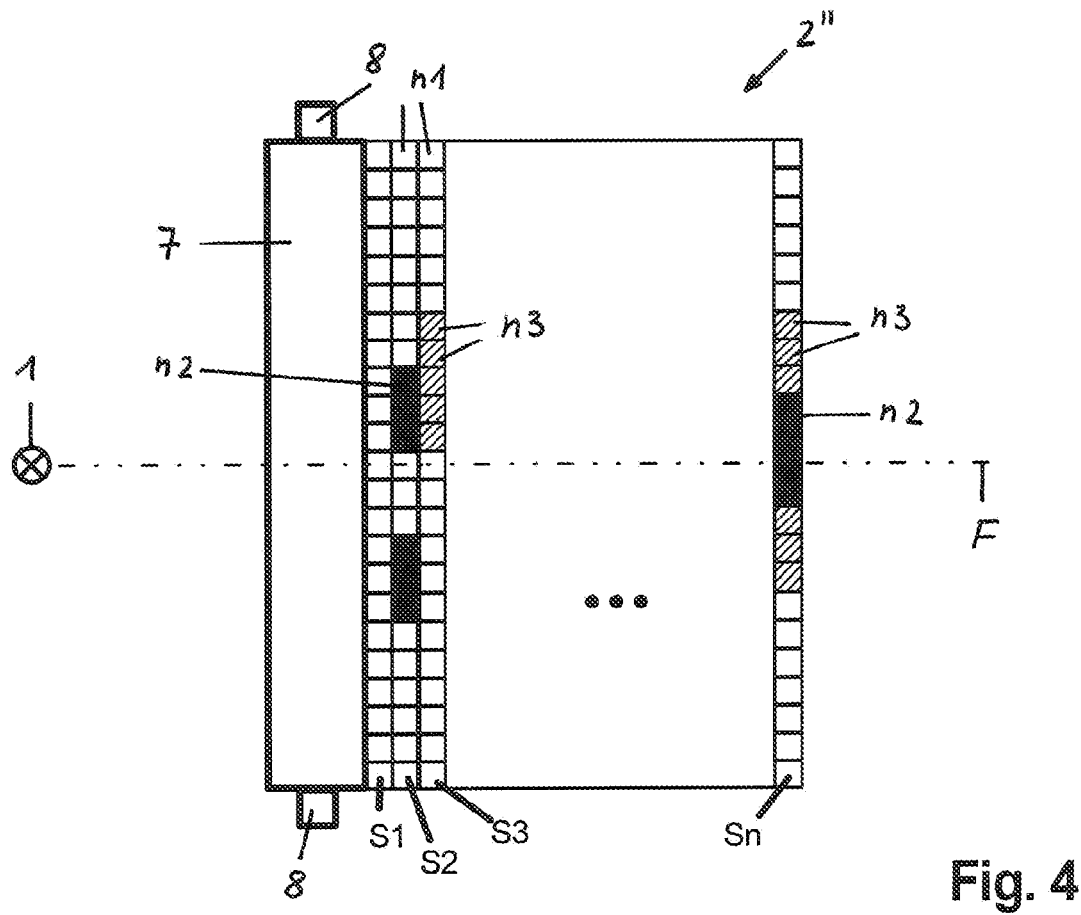
FIG. 4 shows a schematic representation of a further embodiment of the lighting apparatus.

According to a further embodiment of the invention according to FIG. 4, an optical element 2" is provided, whose layers S1, S2, S3 ... $S_n$ each have sections $A_{11}$, $A_{12}$, $A_{13}$, $A_{21}$, $A_{22}$, ... $A_{nm}$, in which materials with the refractive index n1 (white area) and with refractive index n2 (black area) and with refractive index n3 (cross-hatched area) are arranged in a distributed manner. A few sections A are shown in FIG. 4 merely by way of example. Any desired light formations can be created by appropriately distributing the materials with the refractive indices n1, n2, n3.

It is understood that refractive indices n1, n2, n3 have a different value.

A support 7, which is preferably designed as a refractive body, adjoins optical element 2" on the side facing light source 1. Holding elements 8 (holder, by means of which the structural unit formed from optical element 2" and support 7 can be fastened to housing 3, are formed on the sides of support 7.

It is understood that optical elements 2 and 2' according to FIGS. 1 and 2 can also be fixedly connected to support 7.

According to an alternative embodiment of the invention that is not shown, optical elements 2, 2', 2" can be provided with an anti-reflective coating on the light entry side and/or on the light exit side.

Sections $A_{11}$, $A_{12}$, $A_{13}$, $A_{21}$, $A_{22}$, $A_{nm}$ of layers S1, S2, ... $S_n$ each formed of a transparent polymer material.

After the sequential application of layers S1, S2, ... $S_n$, optical element 2, 2', 2" produced in this way is preferably subjected to a heat treatment (e.g., annealing).

Depending on the refractive index n1, n2, n3 of the materials used for sections $A_{11}$, $A_{12}$, $A_{13}$, $A_{21}$, $A_{22}$, ... $A_{nm}$, multiple refractions of light 5 arise in the principal light guiding direction H within optical element 2, 2', 2". Sections $A_{11}$, $A_{12}$, $A_{13}$, $A_{21}$, $A_{22}$, ... $A_{nm}$ thus correspond to conventional lens elements. The smallest lens element corresponds to a section $A_{11}$, $A_{12}$, $A_{13}$, $A_{21}$, $A_{22}$, ... $A_{nm}$. If multiple adjacent sections $A_{11}$, $A_{12}$, $A_{13}$, $A_{21}$, $A_{22}$, ... $A_{nm}$ have the same refractive index n1 or n2 or n3, the lens element has a greater dimension than section $A_{11}$, $A_{12}$, $A_{13}$, $A_{21}$, $A_{22}$, ... $A_{nm}$. Optical element 2, 2', 2 thus has a large number of refractive surfaces of different sizes, on which light 5 is refracted in order to generate the desired light distribution or light formation.

The transparent support 7 is preferably formed from a glass or polymer material.

Support 7 can be embodied as a flat, smooth plate or with scattering optics provided on the surface.

Light source 1 can be embodied as an LED light source, for example.

According to an alternative embodiment of the invention, the optical element can also have a large number of materials with different refractive indices n1, n2, n3, ... nn.

According to an alternative embodiment of the invention that is not shown, the holder 8 can also be molded directly on optical element 2, 2', 2".

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting apparatus for a vehicle, the lighting apparatus comprising:
   a light source; and
   an optical unit to generate a specified light distribution, the optical unit comprising an optical element with a light entry surface to couple in light emitted by the light source and a light exit surface disposed at a distance from the light entry surface to couple out the light that was coupled in at the light entry surface and guided along a principal light guiding direction within the optical element,
   wherein the optical element is embodied as a layered body with a plurality of layers each formed of a plurality of sections, and
   wherein subsets of the plurality of sections within each of the at least two layers of the plurality of layers are formed of different materials having different refractive indices such that refraction occurs within the optical unit.

2. The lighting apparatus according to claim 1, wherein the plurality of layers run substantially parallel to the light entry surface and/or to the light exit surface of the optical element.

3. The lighting apparatus according to claim 1, wherein the plurality of layers each have a same layer thickness.

4. The lighting apparatus according to claim 3, wherein the layer thickness is in a range from 10 μm to 30 μm.

5. The lighting apparatus according to claim 1, wherein the plurality of layers of the optical element are connected in one piece to one another, and wherein adjacent layers lie flat against one another.

6. The lighting apparatus according to claim 1, wherein the optical element is produced by a sequential application of the layers.

7. The lighting apparatus according to claim 1, wherein the optical element is produced by printing the plurality of layers.

8. The lighting apparatus according to claim 1, wherein the sections of the at least two layers are arranged one behind the other in the principal light guiding direction and are formed of the materials with different refractive indices so that the refractive indices of the materials change at least twice in the principal light guiding direction.

9. The lighting apparatus according to claim 1, wherein the sections of each of the plurality of layers are arranged in a matrix-like manner in columns and rows, and wherein each of the sections of the plurality of layers are the same size.

10. The lighting apparatus according to claim 1, wherein the sections of the plurality of layers are arranged in alignment with one another and projected in the principal light guiding direction.

11. The lighting apparatus according to claim 1, wherein the optical element is applied to a transparent support.

12. The lighting apparatus according to claim 11, wherein the transparent support is a refractive body.

13. The lighting apparatus according to claim 11, wherein the layered body and/or the support has at least one holder to fasten the layered body and/or the support to a housing of the lighting apparatus.

14. The lighting apparatus according to claim 1, wherein the light source and the optical element are disposed in a pot-shaped housing, which is closed by a cover plate.

15. The lighting apparatus according to claim 1, wherein the light entry surface and/or the light exit surface of the layered body is provided with an anti-reflective coating.

* * * * *